United States Patent
Miyazaki et al.

(10) Patent No.: US 6,487,518 B1
(45) Date of Patent: Nov. 26, 2002

(54) THICKNESS REDUCING MANAGEMENT SYSTEM FOR PIPES IN PIPE LINES

(75) Inventors: Katsumasa Miyazaki, Hitachi (JP); Satoru Aoike, Hitachi (JP); Satoshi Kanno, Hitachi (JP); Masakazu Hisatsune, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 09/598,050

(22) Filed: Jun. 21, 2000

(30) Foreign Application Priority Data

Jun. 24, 1999 (JP) .......................................... 11-177779

(51) Int. Cl.$^7$ ............................................. G01B 11/02
(52) U.S. Cl. ........................................ 702/170; 73/625
(58) Field of Search ................................ 702/170, 5, 6, 702/8, 33, 45, 49, 50, 96, 100, 130, 136, 142, 172; 703/5, 9; 73/1.16, 1.29, 1.37, 1.48, 1.79, 1.81, 54.42, 73, 75, 77, 152.18, 152.21, 152.33, 170.01, 170.12, 861, 861.01, 861.85, 292, 497, 514.05, 521, 625

(56) References Cited

U.S. PATENT DOCUMENTS

| | | | | |
|---|---|---|---|---|
| 3,955,425 A | * | 5/1976 | Corneau | 73/622 |
| RE30,088 E | * | 9/1979 | Lund et al. | 241/261 |
| 4,324,982 A | * | 4/1982 | Poulsen | 250/559.14 |
| 4,611,170 A | * | 9/1986 | Stanley et al. | 324/229 |
| 5,138,644 A | * | 8/1992 | McArdle et al. | 376/245 |
| 5,283,520 A | * | 2/1994 | Martin et al. | 324/220 |
| 5,313,837 A | * | 5/1994 | Haynes | 73/622 |
| 5,459,936 A | * | 10/1995 | Stange | 33/501.08 |
| 5,583,292 A | * | 12/1996 | Karbach et al. | 73/588 |
| 5,760,413 A | * | 6/1998 | Kurachi et al. | 250/223 R |
| RE36,130 E | * | 3/1999 | Haynes | 297/323 |
| 5,965,818 A | * | 10/1999 | Wang | 73/598 |
| 6,000,288 A | * | 12/1999 | Kwun et al. | 73/597 |
| 6,003,377 A | * | 12/1999 | Waag et al. | 702/171 |

FOREIGN PATENT DOCUMENTS

| | | |
|---|---|---|
| JP | 8-17812 | 12/1996 |
| JP | 10-141600 | 5/1998 |

\* cited by examiner

Primary Examiner—Marc S. Hoff
Assistant Examiner—Edward Raymond
(74) Attorney, Agent, or Firm—Mattingly Stanger & Malur, P.C.

(57) ABSTRACT

In a thickness reducing management for pipes in pipe lines, limited proper parameters which cause erosion and corrosion of the pipes are selected and with these parameters a pipe thickness reducing speed evaluation model formulas are constructed, and by making use of the model formulas thickness reducing amount of the pipes is evaluated. Thereby, conventional difficulty of formulating a proper pipe thickness reducing estimation model formula in view of actual pipe material and pipe inner fluid state because of too many possibly influential parameters causing pipe thickness reducing due to erosion and corrosion, and conventional difficulty of performing highly reliable pipe thickness reducing management are overcome.

20 Claims, 6 Drawing Sheets

FIG. 2

| PIPE LINE MATERIAL | INNER FLUID STATE | EVALUATION PARAMETERS | THICKNESS REDUCING SPEED MODEL FORMULA |
|---|---|---|---|
| CARBON STEEL | LIQUID PHASE | TEMPERATURE T, FLOW SPEED v | $w = \alpha_1(T) \beta_1(v)$ $(T<T_1, v<v_1)$ |
| | | | $w = \alpha_2(T) \beta_2(v)$ $(T<T_1, v>v_1)$ |
| | | | $w = \alpha_3(T) \beta_3(v)$ $(T>T_1, v<v_1)$ |
| | | | $w = \alpha_4(T) \beta_4(v)$ $(T>T_1, v>v_1)$ |
| | LIQUID+GAS PHASE | WETNESS J, TEMPERATURE T | $w = \alpha_5(T) \gamma_1(j)$ $(T<T_1)$ |
| | | | $w = \alpha_6(T) \gamma_2(j)$ $(T>T_1)$ |
| LOW ALLOY STEEL | LIQUID+GAS PHASE | TEMPERATURE T | $w = \alpha_7(T)$ $(T<T_1)$ |
| | | | $w = \alpha_8(T)$ $(T>T_1)$ |

XXXX YEAR AA MONTH BB DAY

THICKNESS MEASUREMENT ANNUAL PLAN & SCHEDULE

| THICKNESS MEASUREMENT OBJECT PORTION | REMAINING LIFE | NEXT PERIODIC INSPECTION | SECOND NEXT PERIODIC INSPECTION | THIRD NEXT PERIODIC INSPECTION |
|---|---|---|---|---|
| A | XA YEAR | — | — | ○ |
| B | XB YEAR | — | ○ | — |
| C | XC YEAR | ○ | — | — |
| D | XD YEAR | — | — | ○ |
| .... | .... | .... | .... | .... |

NEXT PERIODIC INSPECTION : AFTER CC YEARS
SECOND NEXT PERIODIC INSPECTION : AFTER DD YEARS
THIRD NEXT PERIODIC INSPECTION : AFTER EE YEARS

○ : PERFORM THICKNESS MEASUREMENT
— : NOT PERFORM THICKNESS MEASUREMENT

THICKNESS REDUCING MANAGEMENT SYSTEM FOR PIPES IN PIPE LINES

BACKGROUND OF THE INVENTION

1. Field of the Invention

The present invention relates to a thickness reducing management system for pipes in pipe lines which performs a thickness management for the pipes in pipe lines in plants such as an electric power generation plant and chemical plant which are controlled under demineralized water.

2. Conventional Art

Inside pipe lines of an electric power generation plant, steam of high temperature, high pressure and high speed, water of high temperature, high pressure and high speed and two phase fluid of steam and water of high temperature, high pressure and high speed flow, and the pipes in pipe lines are always subjected to a severe environmental circumstance. For this reason, such as erosion and corrosion are induced on the inside surfaces of the pipes in pipe lines and a secular thickness reducing phenomenon is caused thereon. When this thickness reducing phenomenon advances, there arises a danger of leaking the fluid inside the pipe lines which causes a significant problem. The speed of such thickness reducing phenomenon is not uniform with regard to space and time, and further it is understood that the thickness reducing speed also varies depending on a variety of conditions such as, for example, conditions of fluid in the pipe lines and configurations of the pipe lines. Therefore, a variety of experiments with regard to thickness reducing management for pipes in pipe lines were performed until now. Examples of such thickness reducing management systems for pipes in pipe lines in a plant are disclosed in following Japanese patent application laid open prints.

In a method of thickness reduction calculation and evaluation for machines and apparatuses, pipe line arrangement and the like due to erosion and corrosion as disclosed in JP-A-8-178172 (1996), a relationship between such as pipe material components, water quality and fluid flow speed representing parameters of erosion and corrosion inducing the thickness reducing phenomenon and thickness reducing data is analyzed based on thickness reducing measurement data base of more than one type plants and thickness reducing data base from documents data and experimental data which represent general data relating to thickness reducing speed, a mathematical model formula used for the thickness reducing calculation is prepared, in that a relationship between the parameters of erosion and corrosion and the thickness reducing amount is expressed by a function, data base for thickness reducing calculation formula due to erosion and corrosion is newly constructed for every condition of respective erosion and corrosion parameters, thereby, a thickness reducing calculation and evaluation thereof due to erosion and corrosion are realized based on the newly constructed thickness reducing calculation formula.

Further, thickness reducing managing system for pipes in pipe lines as disclosed in JP-A-10-141600 (1998) is for performing a thickness reducing management based on thickness values of the pipes in pipe lines. The thickness reducing managing system is provided with a recording means which records thickness values at a plurality of measurement points determined for every measurement portion; a thickness reducing speed calculating means which calculates thickness reducing speeds at the respective measurement points based on differences between thickness values at the present inspection of the respective measurement points and thickness values at the previous inspection of the respective corresponding measurement points and a plant operation time from the previous inspection to the present inspection; and a remaining life estimating means for estimating remaining life of the pipe lines for every measurement portion based on a maximum value among respective thickness reducing speeds at respective measurement points calculated at the present inspection and a minimum thickness value among respective thickness values for the respective measurement points.

In the thickness reducing calculation and evaluation method due to erosion and corrosion of the machines and apparatuses, pipe line arrangement and the like as disclosed in JP-A-8-178172 (1996), the pipe thickness reducing speed due to erosion and corrosion is expressed with regard many parameters such as temperature effect parameter, fluid flow speed parameter, dissolved oxygen density effect parameter, configuration effect parameter, pH effect parameter, pipe material component parameter and wetness degree effect parameter, however, it is difficult to determine that all of these parameters affect the pipe thickness reducing speed, therefore, the pipe thickness reducing speed calculation formula is not expressed with proper parameters. Further, even if the pipe thickness reducing speed can be calculated properly with the calculation formula, it is impossible to evaluate an inspection interval for the pipe lines based on the pipe thickness reduced amount.

Further, since the thickness reducing managing system for pipes in pipe lines as disclosed in JP-A-10-141600 (1998) performs the pipe thickness reducing management based on the thickness values of the pipes in pipe lines, only the data of a concerned measurement portion including a plurality of measurement points not of the other measurement portions in the pipe lines are used for the calculation of pipe thickness reducing speed and the evaluation thereof, therefore, it was difficult to analyze causes of the thickness reducing of pipes in the pipe line concerned. Further, even when a rapid pipe thickness reducing speed is measured for another pipe line under same condition of water quality and internal fluid state, the data of such rapid pipe thickness reducing speed can not be reflected on the thickness reducing management for the pipes in the pipe line concerned.

In the conventional method, too many parameters which affect the pipe thickness reducing due to erosion and corrosion are used, and in view of the pipe material components and the fluid state in the pipe lines it was difficult to define a proper pipe thickness reducing estimation formula which takes into account its causes, and a thickness reducing management of pipes in pipe lines which takes into account of safety of a plant was impossible.

SUMMARY OF THE INVENTION

An object of the present invention is to resolve the conventional problems as referred to above.

More specifically, an object of the present invention is to provide a thickness reducing management system for pipes in pipe lines in which a thickness reducing speed in the pipes due to erosion and corrosion is properly evaluated based on past and present data and through selection of limited proper parameters affecting thereto, thereby, reliability of remaining life evaluation of the pipes until the thickness thereof reaches to a minimum necessary thickness is enhanced and the pipe thickness reducing condition is correctly evaluated.

Further, an object of the present invention is to provide a thickness reducing management system for pipes in pipe lines in which a proper inspection internal can be set for every measurement portion of the pipe lines depending on the pipe thickness reducing condition and in view of pipe thickness reducing conditions of other measurement portions, therefore, a systematic maintenance and preventive maintenance scheduled for respective pipe lines can be planned, maintenance cost and inspection cost for the plant are reduced and optimized, and safety with regard to leakage of fluid flowing through the pipe lines is enhanced to thereby greatly contribute to a stable electric power supply.

According to one aspect of the present invention proposes a thickness reducing evaluation system for pipes in pipe lines, in particular, for pipes in pipe lines made of either carbon steel or low alloy steel in a plant controlled under demineralized water, which comprises a pipe thickness measurement result data base unit which stores pipe thickness measurement results for respective measurement points performed during inspection of the pipe lines; a point pipe thickness reducing speed calculation unit which calculates a measurement pipe thickness reducing speed through comparison of thickness measurement results at present inspection with thickness measurement results of the pipes in the pipe lines performed at the previous inspection both of which are stored in the pipe thickness measurement result data base unit; a pipe line condition measurement unit which is constituted by a first measurement subunit for measuring pipe line temperature or fluid temperature inside the pipe lines, a second measurement subunit for measuring wetness of the fluid in the pipe lines and a third measurement subunit for measuring fluid speed in the pipe lines; a pipe line condition data base unit which stores pipe line condition data from the pipe line condition measurement unit; a pipe thickness reducing speed model formula constructing unit which constructs a mathematical formula expressing pipe thickness reducing speed using the measurement result of pipe line temperature or the measurement result of the fluid temperature inside the pipe line, the measurement result of wetness of the fluid in the pipe lines and the measurement result of the fluid flow speed in the pipe lines as parameters and by making use of maximum values of the measurement pipe thickness reducing speed calculated by the point pipe thickness reducing speed calculation unit; a maximum pipe thickness reducing speed calculation unit which calculates a maximum pipe thickness reducing speed by making use of pipe line conditions at respective pipe thickness reducing measurement points concerned in the pipe lines; a next inspection interval calculation unit which determines an inspection interval until next time for the pipe lines through calculation of an interval when the pipe thickness of the pipe lines reaches a predetermined pipe thickness to be inspected by making use of the maximum pipe thickness reducing speed from the maximum pipe thickness reducing speed calculation unit and the predetermined pipe thickness to be inspected; and a pipe thickness measurement annual plan and schedule preparing unit which prepares a pipe thickness measurement annual plan and schedule based on the inspection interval until the next time inspection.

The above thickness reducing evaluation system for pipes in pipe lines can be modified in such a manner that the pipe thickness reducing speed model formula construction unit constructs the mathematical formula expressing the pipe thickness reducing speed by using pipe line temperature or fluid temperature in the pipe lines, fluid wetness in the pipe lines and fluid speed in the pipe line at the time of design stage thereof as parameters and by making use of the maximum values of the pipe thickness reducing speed calculated by the point pipe thickness reducing speed calculation unit, thereby, a simple pipe thickness reducing speed model formula can be constructed.

Further, in the above pipe thickness reducing speed model formula constructing unit and the above modified pipe thickness reducing speed model formula constructing unit, the total measurement data in the plant concerned are classified into three types, in that into the measurement data in the case where the inner fluid is a single liquid phase and the pipe material is carbon steel, the measurement data in the case where the inner fluid is two phases of gas and liquid and the pipe material is a carbon steel, and the measurement data in the case where the pipe material is a low alloy steel, for determining the pipe thickness reducing speed used for constructing the pipe thickness reducing speed model formula, and the thickness reducing speed model formula is constructed by making use of the thus classified total measurement data under respective conditions.

Further, in the above pipe thickness reducing speed model formula constructing unit, the pipe thickness reducing speed model formulas under the respective conditions are constructed in such a manner that in the case where the inner fluid is a single phase of liquid and the pipe material is a carbon steel, the measurement result of the pipe line temperature or the measurement result of the fluid temperature in the pipe lines and the measurement result of the fluid flow speed in the pipe line are used as the parameters for expressing the pipe thickness reducing speed, in the case where the inner fluid is two phases of gas and liquid and the pipe material is a carbon steel, the measurement result of the pipe line temperature or the measurement result of the fluid temperature in the pipe lines and the measurement result of the wetness of the fluid in the pipe lines are used as the parameters for expressing the pipe thickness reducing speed and in the case where the pipe material is a low alloy steel, the measurement result of the pipe line temperature or the measurement result of the fluid temperature inside the pipe lines is used as the parameter for expressing the pipe thickness reducing speed.

Further, in the above modified pipe thickness reducing speed model formula constructing unit, the pipe thickness reducing speed model formulas under the respective conditions are constructed in such a manner that in the case where the inner fluid is a single phase of liquid and the pipe material is a carbon steel, the pipe line temperature and the fluid flow speed in the pipe line which were estimated in the design stage thereof are used as the parameters for expressing the pipe thickness reducing speed, in the case where the inner fluid is two phases of gas and liquid and the pipe material is a carbon steel, the pipe line temperature and the wetness of the fluid in the pipe lines which were estimated in the design stage thereof are used as the parameters for expressing the pipe thickness reducing speed and in the case where the pipe material is a low alloy steel, the pipe line temperature which was estimated in the design stage thereof is used as the parameter for expressing the pipe thickness reducing speed.

Still further, the first subunit for measuring the pipe line temperature or the fluid temperature inside the pipe line constituting the above pipe line condition measurement unit evaluates the temperature of the inner surface of the pipe lines from the temperature of the outer surface of the pipe lines through a thermo couple attached on the outer surface of the pipe lines and a reverse problem analysis program based on thermal conduction analysis result thereof.

Still further, in the above next inspection interval calculation unit the next inspection interval is set in such a manner that a permissible pipe thickness reducing amount permitted until the next inspection which is obtained by subtracting the predetermined pipe thickness to be inspected from the present pipe thickness concerned is at first divided by the maximum pipe thickness reducing speed calculated by the above maximum pipe thickness reducing speed calculation unit and then the calculated interval is further divided by a predetermined safety rate.

Still further, in the above pipe thickness measurement annual plan and schedule preparing unit, the pipe thickness measurement annual plan and schedule is prepared in such a manner that the next inspection interval calculated by the next inspection interval calculation unit and the remaining life calculated by the remaining life evaluation and calculation unit are displayed with regard to all pipe line portions in the plant requiring inspection and further the inspection time after the next inspection is also displayed with regard to the all pipe line portions.

DETAILED DESCRIPTION OF THE PREFERRED EMBODIMENTS

Hereinbelow, embodiments according to the present invention will be explained with reference to the drawings.

Figure 1:
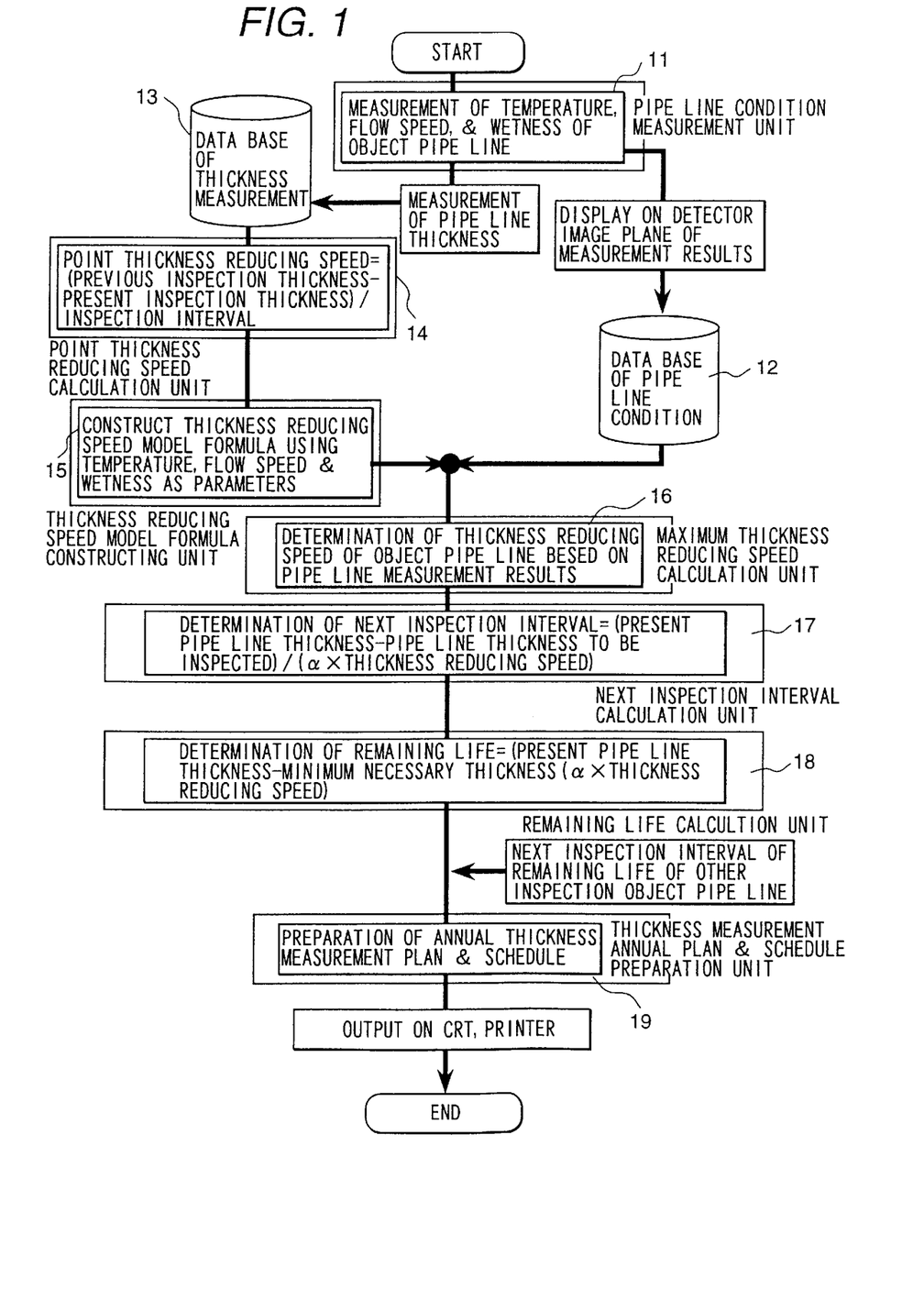
FIG. 1 is a construction diagram of a thickness reducing management system for pipes in pipe lines representing a first embodiment according to the present invention.

The construction diagram of the thickness reducing management system for pipes in pipe lines representing the first embodiment according to the present invention as shown in FIG. 1 also serves as a flow chart for explaining the management performed by the system. The thickness reducing management of pipes in the pipe lines is performed through the flow chart as shown in FIG. 1. The present invention is applied to pipes made of a carbon steel and of a low alloy steel in a plant which is controlled under demineralized water. At the time of periodical inspection of the plant such as every one year, temperature of the object pipes in the pipe lines is measured with a thermo couple attached beforehand on the outer surface of the pipe or with a thermo couple inserted into the inside of the pipe. Likely, the wetness of the fluid in the pipe lines and the flow speed thereof are measured respectively with a wetness measurement subunit and a flow speed measurement subunit of the fluid in the pipe lines disposed beforehand in the pipe lines. A pipe line condition measurement unit 11 in FIG. 1 corresponds to the portion for measuring the temperature of pipes in the pipe lines, the wetness of the fluid in the pipe lines and the flow speed thereof.

These pipe line temperature measurement result, pipe line inner fluid wetness and pipe line inner fluid flow speed measurement result are displayed on respective screens of the measurement subunits. Further, at this instance with regard to the pipe temperature, the inner surface temperature of the pipe is an object temperature to be evaluated. Therefore, when temperature is measured with a thermo couple attached to the outer surface of the pipe, the inner surface temperature of the pipe is estimated through analysis of thermal conduction of the pipe and a reverse problem analysis program, and the thus obtained inner surface temperature of the pipe is used as the temperature for evaluation, and the above pipe temperature, the pipe inner fluid wetness and the flow speed thereof measured in connection with the concerned pipe line are stored in a pipe line condition data base 12.

Subsequently, the thickness of the concerned pipe in the pipe line is measured with a ultrasonic thickness meter. The thickness of pipes in pipe lines is usually measured with a pitch interval of about 10 mm~50 mm in circumferential and axial directions of the pipe. The pipe thickness data measured at the present time are stored in a pipe thickness measurement data base 13. Further, in this pipe thickness measurement data base 13 pipe thickness measurement results at other pipe line measurement portions in the same plant and pipe thickness measurement data obtained until the previous periodical inspection are inclusively stored. Further, when storing these data the pipe material and the temperature, the pipe inner fluid wetness and the pipe inner fluid flow speed stored previously in the pipe line condition data 12 are also stored together.

Then, by making use of the pipe thickness measurement result performed at the present time and the previous pipe thickness measurement result at the same measurement point both of which are stored in the pipe thickness measurement data base, in that after subtracting the present pipe thickness measurement result from the previous pipe thickness measurement result, the subtraction result is divided by the interval from the previous inspection to the present inspection, thereby, a point pipe thickness reducing speed at the concerned pipe thickness measurement point is calculated. The above processing portion corresponds to a point pipe thickness reducing speed calculating unit 14. The calculated point pipe thickness reducing speed data are also stored in the pipe thickness measurement data base 13 as data corresponding to the present pipe thickness measurement results.

Figure 2:
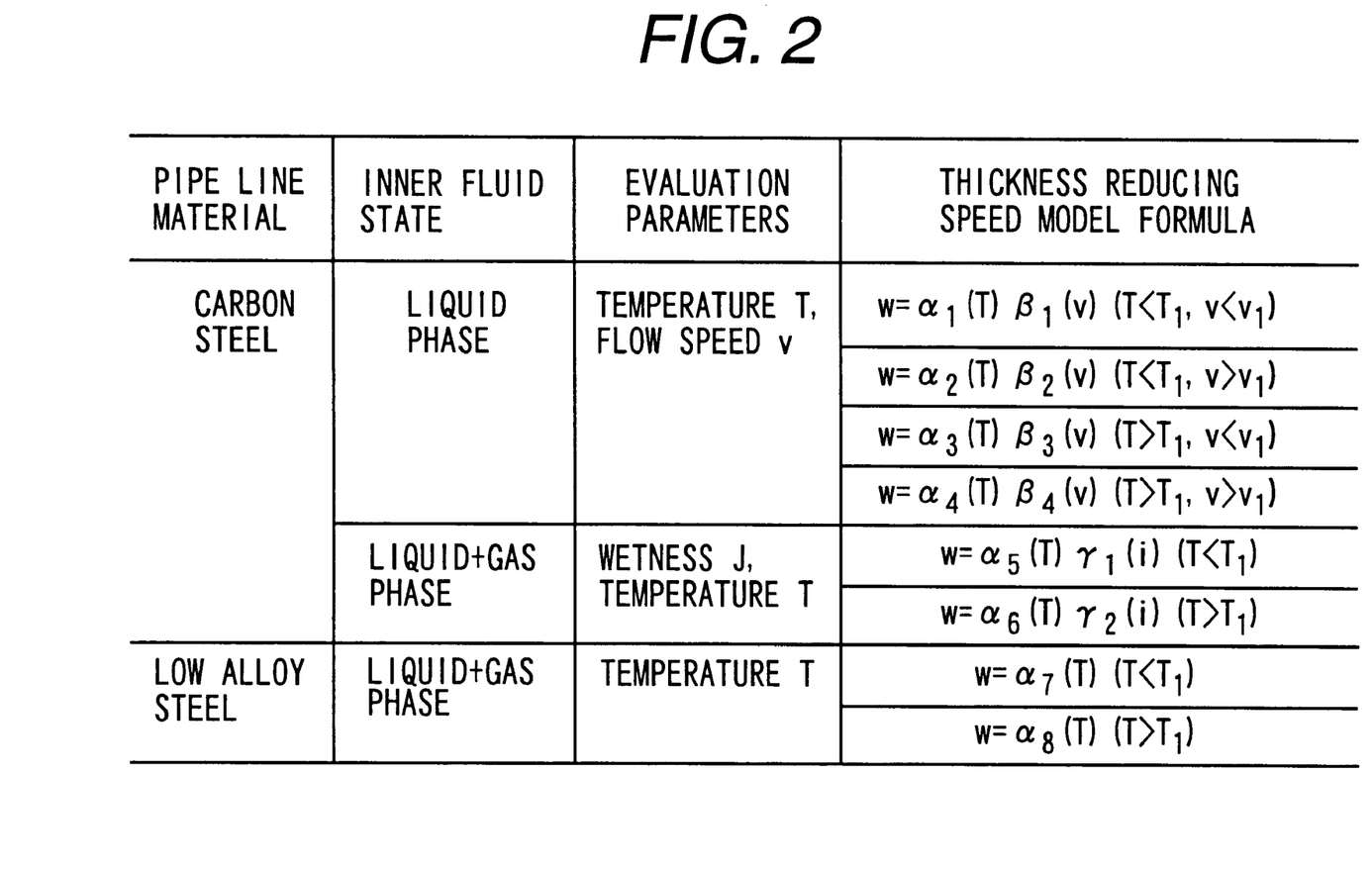
FIG. 2 is a diagram showing classification and examples of pipe thickness reducing speed model formulas according to pipe materials and state of inner fluid in pipe lines according to the present invention.

Thereafter, the pipe thickness measurement data and the point pipe thickness reducing speed data stored in the pipe thickness measurement data base 13 are classified in view of the differences in pipe material, pipe temperature, pipe inner fluid wetness and pipe inner fluid flow speed. An example in which the pipe thickness reducing speed data are classified according to the differences in pipe material and in pipe inner fluid state is shown in FIG. 2. More specifically, the pipe thickness reducing speed data are classified depending on differences whether the pipe material is a carbon steel or a low alloy steel and whether the pipe inner fluid is a single phase of liquid or two phases of gas and liquid. Further, the thus classified pipe thickness reducing speeds are formulated into model formulas in such a manner that in the case where the inner fluid is a single phase of liquid and the pipe material is a carbon steel, the pipe line temperature and the fluid flow speed in the pipe line are used as the parameters, in the case where the inner fluid is two phases of gas and liquid and the pipe material is a carbon steel, the pipe line temperature and the wetness of the fluid in the pipe lines are used as the parameters and in the case where the pipe material is a low alloy steel, only the pipe line temperature is used as the parameter.

Figure 3A:
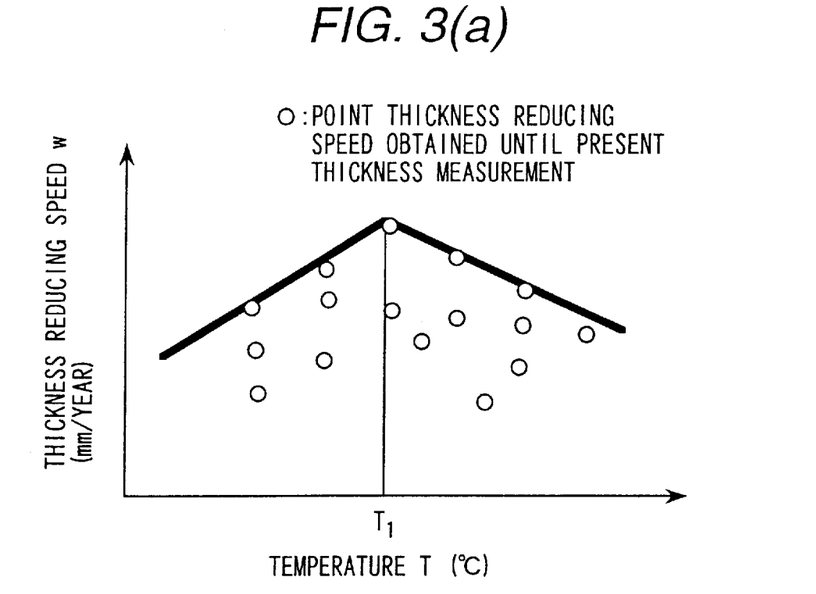
FIGS. 3(a) and 3(b) are diagrams for explaining pipe thickness reducing speed model formulas which are constructed while using pipe thickness reducing speeds at total measurement portions concerned according to the present invention.
Figure 3B:
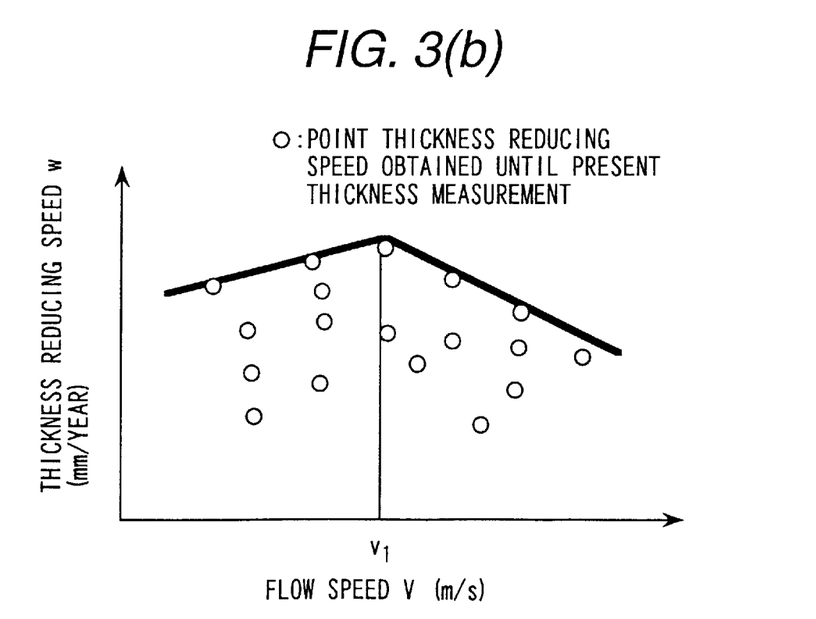

The classified pipe thickness reducing speeds are mathematically formulated by making use of the point pipe thickness reducing speed data, the pipe temperature, the pipe inner fluid wetness and the pipe inner fluid flow speed. The formulation of the pipe thickness reducing speed is determined based on the method as illustrated in FIGS. 3(a) and 3(b). With regard to the relationship between the pipe thickness reducing speed and a variety of conditions, in that the relationship between the pipe thickness reducing speed w and a variety of parameters is sometimes not determined in one to one relationship, even when condition such as pipe inner fluid temperature, wetness, and flow speed and further pipe configuration, dissolved oxygen density and pH of the fluid which are not taken into account or expressly excluded as parameters for expressing the pipe thickness reducing speed in the present embodiment are identical. For example, as illustrated in FIG. 3(a), when relationship between all of the pipe thickness reducing speeds at all of the measurement portions concerned calculated by making use of pipe thickness measured until the present periodical inspection and the temperatures are plotted, the relationship between the pipe thickness reducing speed w and temperature T can not be expressed in a function which determines the relationship as one to one relationship, even if conditions such as pipe material, pipe inner fluid wetness and others are identical. Therefore, as illustrated in FIG. 3(a) pipe thickness reducing speeds are formulated in a mathematical model which envelopes the maximum values of the pipe thickness reducing speed measured until the present periodical inspection, in that by making use of the maximum values other than such as average values thereof. Further, as illustrated in FIG. 3(a), the relationship between the pipe thickness reducing speed w and the temperature T is modeled by a function expressed by a plurality of straight lines sectioned by a certain bounding temperature such as T1.

As illustrated in FIG. 3(b), the relationship between pipe thickness reducing speed w and flow speed v is similar to the relationship between pipe thickness reducing speed w and temperature T. Namely, the relationship between pipe thickness reducing speed w and fluid flow speed v is modeled by a function expressed by a plurality of straight lines sectioned by a certain bounding flow speeds such as v1. These pipe thickness reducing speed model formulas which are determined in view of differences in pipe material and inner fluid state are inclusively shown in FIG. 2. The hitherto explained processing corresponds to a pipe thickness reducing model formula constructing unit 15 in FIG. 1.

Then, when the conditions of pipe temperature, pipe inner fluid wetness and pipe inner fluid flow speed which were measured until now are substituted into the previously constructed pipe thickness reducing speed model formula concerned, a pipe thickness reducing speed which is caused in the measurement object pipe is calculated and determined. Further, since the previously constructed pipe thickness reducing speed model formula is formulated for the maximum pipe thickness reducing speeds, the pipe thickness reducing speed calculated here represents an estimated maximum pipe thickness reducing speed. The hitherto explained processing corresponds to a maximum pipe thickness reducing speed calculation unit 16 in FIG. 1.

Now, by making use of the present pipe thickness measured and a predetermined pipe thickness, in that a pipe thickness to be inspected, a pipe thickness reducing amount at the portion concerned which is estimated at the time of the next inspection is calculated. Further, the pipe thickness to be inspected is to be set in view of a permissible pipe thickness, in that a necessary minimum pipe thickness. Herein, by making use of the pipe thickness reducing speed (the maximum pipe thickness reducing speed) at the pipe line portion concerned which is determined previously with the pipe thickness reducing speed model formula, an interval until the next inspection is determined according to the following equation;

$$\text{Next inspection interval} = (\text{present pipe thickness} - \text{pipe thickness to be inspected})/(\alpha \times \text{pipe thickness reducing speed}) \quad (1)$$

Wherein, $\alpha$ represents a safety rate of equal to or more than value 1. With the above equation the interval until the next inspection is calculated. The hitherto explained processing corresponds to a next inspection interval calculation unit 17 in FIG. 1.

Now, by making use of the present pipe thickness measured and the minimum necessary pipe thickness, a remaining life for the pipe line concerned is calculated. A remaining life for a pipe line concerned is determined according to the following equation;

$$\text{Remaining life} = (\text{present pipe thickness} - \text{minimum necessary pipe thickness})/(\alpha \times \text{pipe thickness reducing speed}) \quad (2)$$

With the above equation a remaining life for a pipe line concerned is calculated. The processing hitherto explained corresponds to a remaining life calculation unit 18 in FIG. 1.

Figure 4:
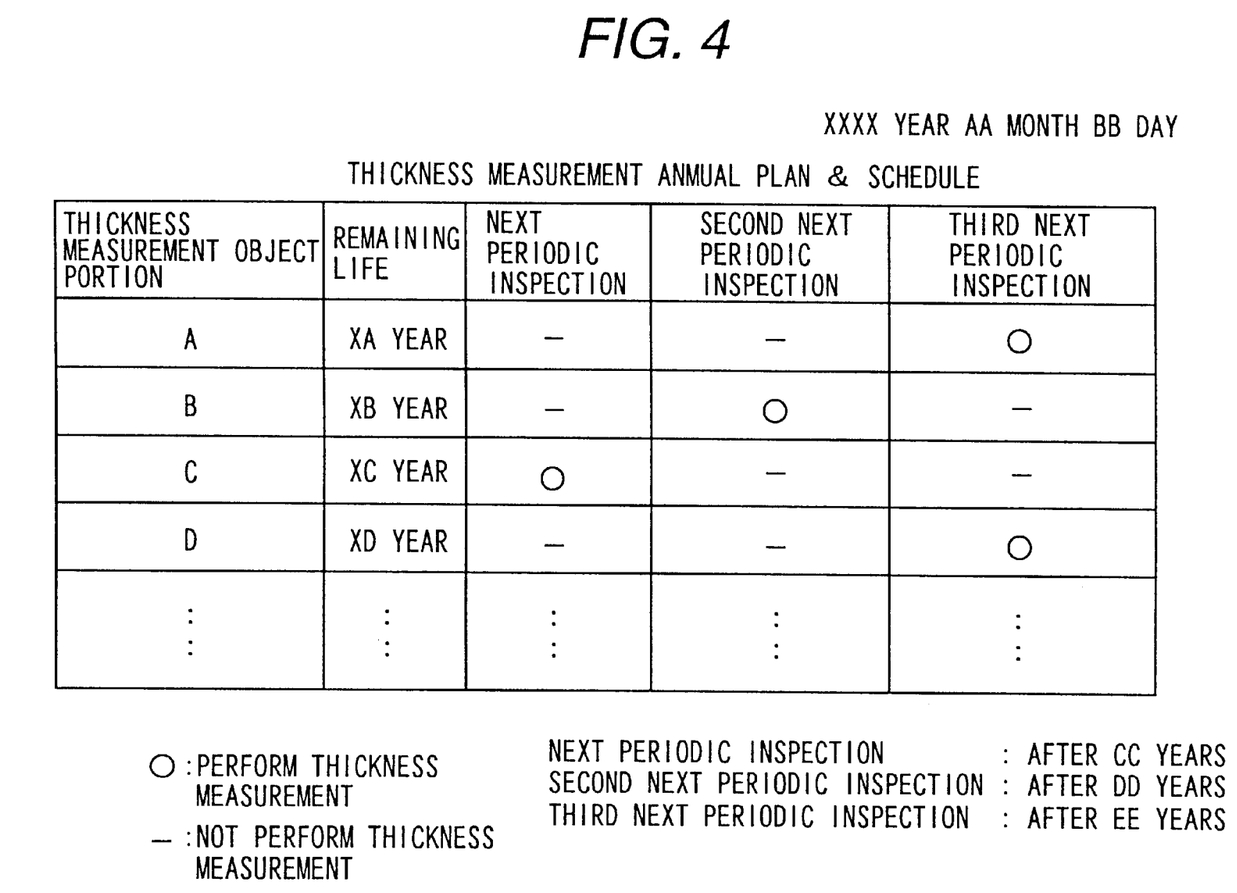
FIG. 4 is a diagram showing an example of a pipe thickness measurement annual plan and schedule prepared according to the present invention.

Subsequently, by making use of the next inspection interval and the remaining life determined previously the pipe thickness measurement annual plan and schedule is prepared. Further, for the preparation of the pipe thickness measurement annual plan and schedule it is necessary to calculate respective next inspection intervals and remaining lifes of the concerned pipe line and all of other inspection object pipe lines in the plant by means of the method as explained until now. By arranging these next inspection intervals and remaining lifes of all of the inspection object pipe lines in the plant the pipe thickness measurement annual plan and schedule is prepared. An example of such pipe thickness measurement annual plan and schedule is shown in FIG. 4. As shown in FIG. 4, in the row, portions of pipe thickness measurement object, remaining life and inspection schedule after next are arranged. Further, in the columns, name of the portions of pipe thickness measurement objects, remaining lifes of the concerned portions of the pipe thickness measurement objects calculated previously, and further yes or no of pipe thickness measurement performance at the time of periodical inspection after next are to be indicated. Further, since the pipe thickness reducing speed model formulas are reconstructed for every periodical inspection by making use of the latest data of the portions where the pipe thickness measurement has been performed, the specific date of preparation of the pipe thickness measurement annual plan and schedule has to be indicated. The hitherto explained processing corresponds to a pipe thickness measurement annual plan and schedule preparation unit 19 in FIG. 1.

The thus determined pipe thickness measurement annual plan and schedule is outputted to a CRT or a printer. Through application of the thickness reducing management system for pipes in pipe lines which performs the processings as has been explained with reference to the flow chart as shown in FIG. 1, the thickness reducing speed of pipes due to erosion and corrosion can be evaluated as well as the pipe thickness measurement annual plan and schedule for performing thickness management for pipes in pipe lines is prepared.

Figure 5:
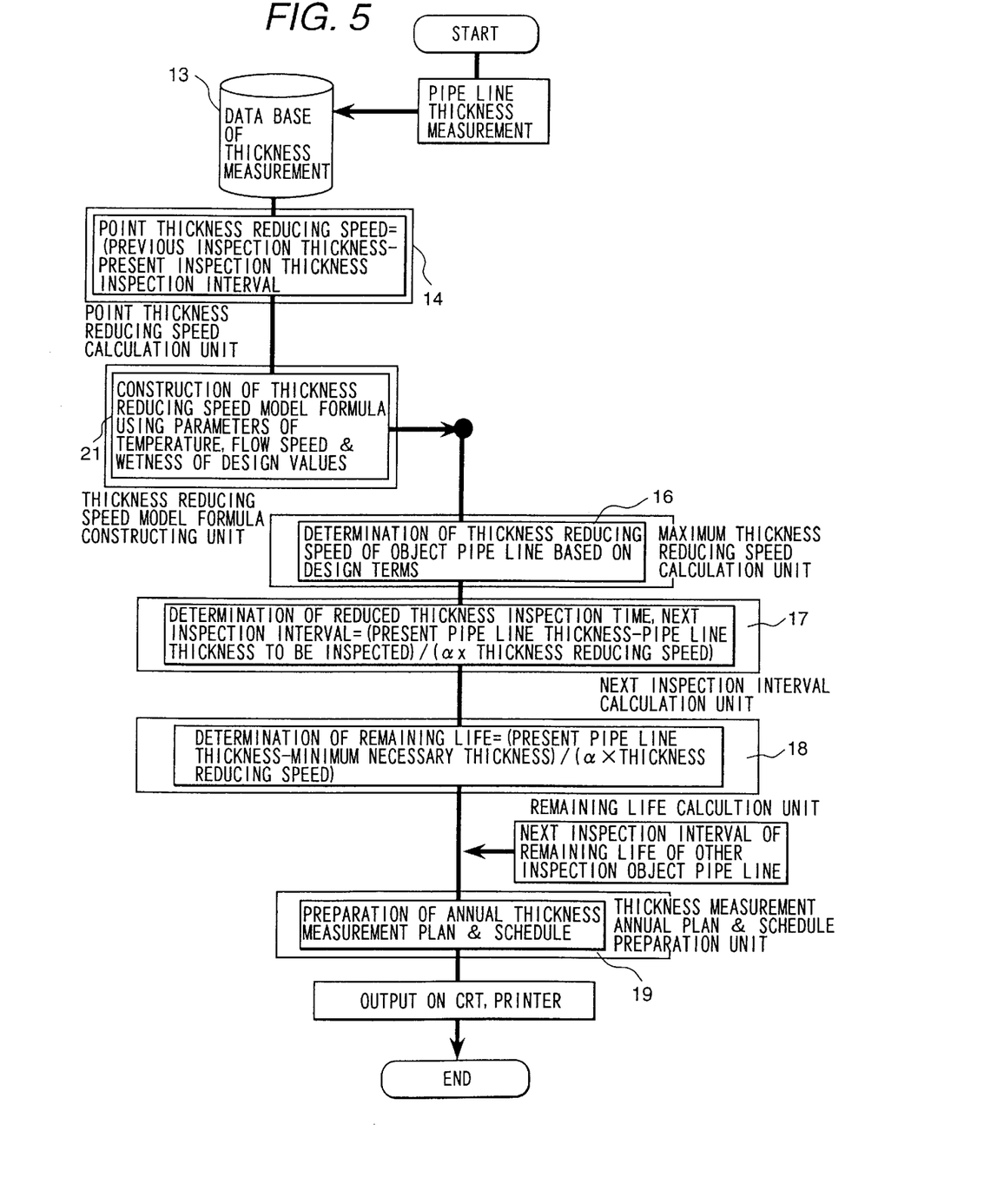
FIG. 5 is a construction diagram of a thickness reducing management system for pipes in pipe lines representing a second embodiment according to the present invention; and, FIG. 6 is a diagram for explaining a method of determining a necessary pipe thickness at design stage which takes into account of erosion and corrosion during the use thereof and makes use of pipe thickness reducing speed model formulas according to the present invention.

A second embodiment of thickness reducing management system for pipes in pipe lines is shown in FIG. 5 which, like FIG. 1 embodiment, serves as a flow chart for explaining the management performed by the system. According to the flow chart as shown in FIG. 5 a management of thickness reducing for pipes in pipe lines is performed. Many portions of the pipe thickness reducing management system as will be explained in connection with FIG. 5 flow chart are the same as the pipe thickness reducing management system of the first embodiment as has been explained in connection with FIG. 1 flow chart. Namely, the next inspection interval calculation unit 17, the remaining life calculation unit 18 and the pipe thickness measurement annual plan and schedule preparation unit 19 are substantially the same as those in FIG. 1 embodiment.

In FIG. 5 embodiment, direct measurement of pipe temperature, pipe inner fluid wetness and fluid flow speed is not performed, as the temperature, wetness and fluid flow speed used for constructing the pipe thickness reducing model formula the temperature, wetness and fluid flow speed which were estimated in the design stage are used. Hereinbelow, a method of constructing a pipe thickness reducing model formula in the pipe thickness, reducing management system will be explained which performs the processings as shown in FIG. 5 flow chart.

The point pipe thickness reducing speed data are classified in view of the differences in pipe material, and pipe temperature, pipe inner fluid wetness and pipe inner fluid flow speed which were estimated in the design stage. An example in which the pipe thickness reducing speed data are classified according to the differences in pipe material and in pipe inner fluid state is shown in FIG. 2. More specifically, the pipe thickness reducing speed data are classified depending on differences whether the pipe material is a carbon steel or a low alloy steel and whether the pipe inner fluid is a single phase of liquid or two phases of gas and liquid. Further, the thus classified pipe thickness reducing speeds are formulated into model formulas in such a manner that in the case where the inner fluid which was estimated at the design stage is a single phase of liquid and the pipe material is a carbon steel, the pipe line temperature and the fluid flow speed in the pipe line which were estimated in the design stage are used as the parameters, in the case where the inner fluid which was estimated in the design stage is two phases of gas and liquid and the pipe material is a carbon steel, the pipe line temperature and the wetness of the fluid in the pipe lines which were estimated in the design stage are used as the parameters and in the case where the pipe material is a low alloy steel, only the pipe line temperature which was estimated in the design stage is used as the parameter. Namely, in contrast to the first embodiment in which the pipe thickness reducing speed model formulas are formulated by making use of the pipe temperature, the inner fluid wetness and the inner fluid flow speed actually measured, in the second embodiment the pipe thickness reducing speed model formulas are formulated by making use of the pipe temperature, the inner fluid wetness and the fluid flow speed which were estimated in the design stage.

Further, when formulating the pipe thickness reducing speed model formulas according to the pipe temperature, the inner fluid wetness and the inner fluid flow speed which were estimated in the design stage, the relationship between the pipe thickness reducing speed w and a variety of parameters is sometimes not determined in one to one relationship, even when condition such as pipe inner fluid temperature, wetness, fluid flow speed, pipe configuration, dissolved oxygen density and pH of the fluid are identical (see FIGS. 3(a) and 3(b)), therefore, it is determined to formulate a pipe thickness reducing speed in a mathematical model which envelopes the maximum values of the pipe thickness reducing speed measured. Further, as illustrated in FIG. 3(a), the relationship between the pipe thickness reducing speed w and the temperature T is modeled by a function expressed by a plurality of straight lines sectioned by a certain bounding temperature such as T1.

The hitherto explained processing corresponds to a pipe thickness reducing speed model formula construction unit 21 in the second embodiment as shown in FIG. 5.

Further, as indicated above, the next inspection interval calculation unit 17, remaining life calculation unit 18 and the pipe thickness measurement annual plan and schedule preparation unit 19 are substantially the same as those in FIG. 1 first embodiment of the thickness reducing management system for pipes in pipe lines. However, in FIG. 5 embodiment the pipe line condition measurement unit 11 is eliminated, therefore, no sensors to be provided along the pipe lines are required, further, the pipe line condition data base 12 is accordingly eliminated, therefore, a simple thickness reducing management system for pipes in pipe lines can be realized in comparison with the first embodiment.

A method of setting pipe thickness representing a third embodiment according to the present invention will be explained hereinbelow which takes into account pipe thickness reducing due to erosion and corrosion in advance at the time of design stage thereof.

At first, a pipe thickness reducing speed model formula for a concerned pipe to be designed is constructed by classifying pipe thickness measurement data in a plant controlled under demineralized water and operated until now. When constructing the pipe thickness reducing speed model formula, the pipe thickness reducing speed data are classified depending on differences whether the pipe material is a carbon steel or a low alloy steel and whether the pipe inner fluid which was estimated in the design stage is a single phase of liquid or two phases of gas and liquid. Further, like the construction of the pipe thickness reducing speed model formula according to the second embodiment, the thus classified pipe thickness reducing speeds are formulated into model formulas in such a manner that in the case where the inner fluid which was estimated at the design stage is a single phase of liquid and the pipe material is a carbon steel, the pipe line temperature and the fluid flow speed in the pipe line which were estimated in the design stage are used as the parameters, in the case where the inner fluid which was estimated in the design stage is two phases of gas and liquid and the pipe material is a carbon steel, the pipe line temperature and the wetness of the fluid in the pipe lines which were estimated in the design stage are used as the parameters and in the case where the pipe material is a low alloy steel, only the pipe line temperature which was estimated in the design stage is used as the parameter. Thereby, a group of pipe thickness reducing speed model formulas which take into account the pipe material and the inner fluid states are determined.

Figure 6:
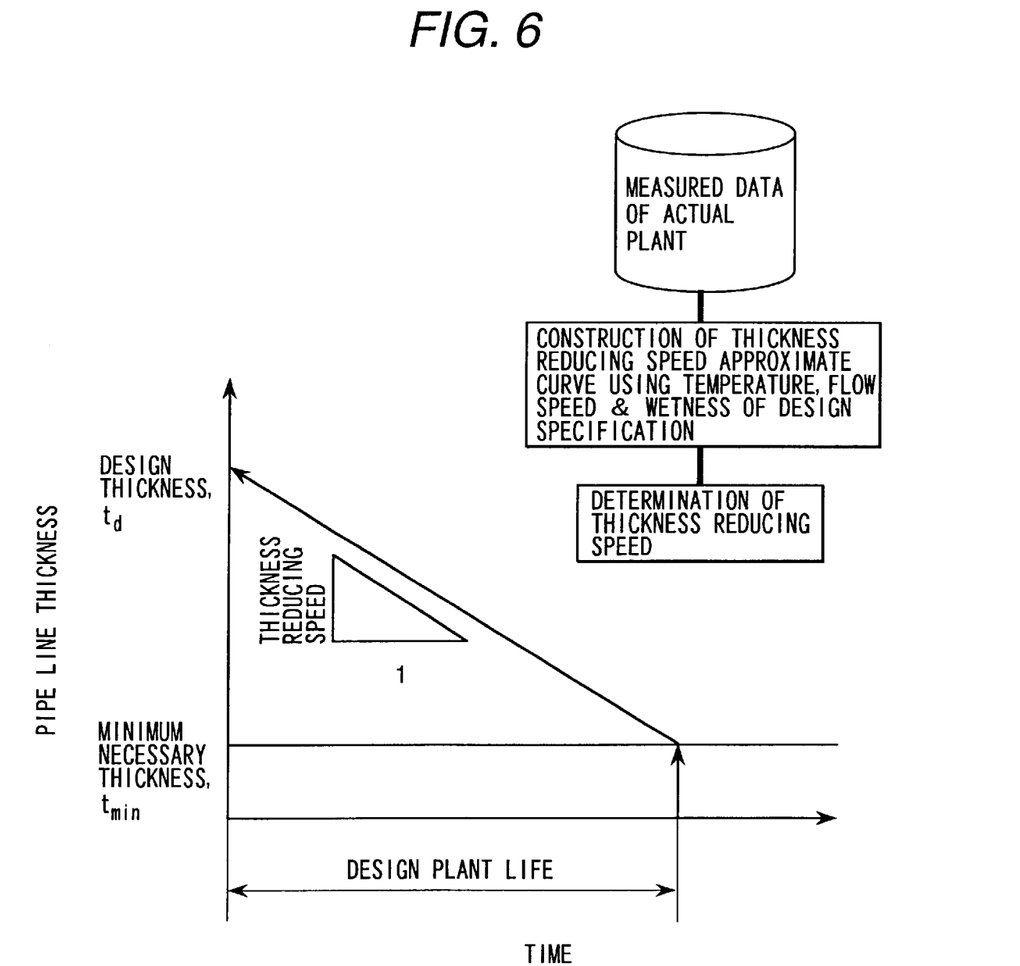

With thus formulated pipe thickness reducing speed model formula a design pipe thickness is determined. A method of determining the design pipe thickness is shown in FIG. 6. At first, it is determined whether the pipe line of the design object is a carbon steel or a low alloy steel. At the same time, the pipe temperature, the pipe line inner fluid wetness and the pipe line inner fluid flow speed are determined. Among the previously constructed group of the pipe thickness reducing speed model formulas a pipe thickness reducing speed model formula which meets the determined pipe material, pipe temperature, pipe line inner fluid wetness and pipe line inner fluid flow speed is determined. After selecting a suitable pipe thickness reducing speed model, a minimum necessary pipe thickness which is required for the pipe is calculated based on information such as pressure of the inner fluid and diameter of the pipe representing design specifications. Further, after determining a design life time for the plant, a diagram as illustrated in FIG. 6 is completed in which the pipe thickness is indicated along the ordinate and time is indicated along the abscissa. From a point on the ordinate corresponding to the minimum necessary pipe thickness, a minimum necessary pipe thickness line is drawn in parallel with the abscissa. From a point representing the design life time of the plant on the minimum necessary pipe thickness line a straight line raising leftward with the slope corresponding to the pipe thickness reducing speed is drawn. The pipe thickness at the crossing point of the straight line with the slope of the pipe thickness reducing speed with the ordinate, namely at the time of zero representing the operation starting time of the plant, is determined as the design thickness.

When a design according to the present embodiment is performed which takes into account of the pipe thickness reducing due to erosion and corrosion from the operation starting time of the plant, pipe lines with a pipe thickness which is controlled so as not to be reduced below the minimum necessary pipe thickness due to erosion and corrosion during the design life time of the plant can be designed, which unnecessitates pipe thickness measurement during the design life time of the plant.

What is claimed is:

1. A thickness reducing evaluation system for pipes in pipe lines, in particular for pipes in pipe lines made of either a carbon steel or a low alloy steel in a plant controlled under demineralized water, comprising:

a pipe thickness measurement result data base unit which stores pipe thickness measurement results for respective measurement points performed during inspection of the pipe lines;

a point pipe thickness reducing speed calculation unit which calculates a pipe thickness reducing speed through comparison of thickness measurement results at present inspection with thickness measurement results of the pipes in the pipe lines performed at previous inspection both of which are stored in the pipe thickness measurement result data base unit;

a pipe line condition measurement unit which is constituted by a first measurement subunit for measuring pipe line temperature or fluid temperature inside the pipe lines, a second measurement subunit for measuring wetness of the fluid in the pipe lines and a third measurement subunit for measuring fluid speed in the pipe lines;

a pipe line condition data base unit which stores pipe line condition data from the pipe line condition measurement unit;

a pipe thickness reducing speed model formula constructing unit which constructs a mathematical formula expressing pipe thickness reducing speed using at least one of the measurement result of pipe line temperature or the measurement result of the fluid temperature inside the pipe lines, the measurement result of wetness of the fluid in the pipe lines and the measurement result of the fluid flow speed in the pipe lines as parameters and by making use of maximum values of the pipe thickness reducing speed calculated by the point pipe thickness reducing speed calculation unit; and a maximum pipe thickness reducing speed calculation unit which calculates a maximum pipe thickness reducing speed based on the constructed pipe thickness reducing speed model formula by making use of pipe line conditions stored in the pipe line condition data base unit at respective pipe thickness reducing measurement points in the pipe lines.

2. A thickness reducing evaluation system for pipes in pipe lines made of either a carbon steel or a low alloy steel in a plant controlled under demineralized water, comprising:

a pipe thickness measurement result data base unit which stores pipe thickness measurement results for respective measurement points performed during inspection of the pipe lines;

a point pipe thickness reducing speed calculation unit which calculates a pipe thickness reducing speed through comparison of thickness measurement results at present inspection with thickness measurement results of the pipes in the pipe lines performed at previous inspection both of which are stored in the pipe thickness measurement result data base unit;

a pipe thickness reducing speed model formula constructing unit which constructs a mathematical formula expressing pipe thickness reducing speed using at least one of the pipe line temperature, wetness of the fluid in the pipe lines and the fluid flow speed in the pipe lines which are determined at design stage as parameters and by making use of maximum values of the pipe thickness reducing speed calculated by the point pipe thickness reducing speed calculation unit;

a maximum pipe thickness reducing speed calculation unit which calculates a maximum pipe thickness reducing speed at respective pipe thickness reducing measurement points in the pipe lines by making use of pipe line conditions in the pipe lines at the design stage based on the constructed pipe thickness reducing speed model formula.

3. A thickness reducing evaluation system for pipes in pipe lines according to claim 1, further comprising a next inspection interval calculation unit which determines an inspection interval until next time for the pipe lines through calculation of an interval when the pipe thickness of the pipe lines reaches a predetermined pipe thickness to be inspected by making use of the maximum pipe thickness reducing speed from the maximum pipe thickness reducing speed calculation unit and the predetermined pipe thickness to be inspected.

4. A thickness reducing evaluation system for pipes in pipe lines according to claim 2, further comprising a next inspection interval calculation unit which determines an inspection interval until next time for the pipe lines through calculation of an interval when the thickness of the pipes in the pipe lines reaches a predetermined pipe thickness to be inspected by making use of the maximum pipe thickness reducing speed from the maximum pipe thickness reducing speed calculation unit and the predetermined pipe thickness to be inspected.

5. A thickness reducing evaluation system for pipes in pipe lines according to claim 1, further comprising a remaining life calculation unit which calculates remaining life of the pipe lines by making use of the maximum pipe thickness reducing speed from the maximum pipe thickness reducing speed calculation unit and a predetermined minimum necessary thickness of the pipes in the pipe lines.

6. A thickness reducing evaluation system for pipes in pipe lines according to claim 2, further comprising a remaining life calculation unit which calculates remaining life of the pipe lines by making use of the maximum pipe thickness reducing speed from the maximum pipe thickness reducing speed calculation unit and a predetermined minimum necessary thickness of the pipes in the pipe lines.

7. A thickness reducing evaluation system for pipes in pipe lines according to claim 1, further comprising:
- a next inspection interval calculation unit which determines an inspection interval until next time for the pipe lines through calculation of an interval when the pipe thickness of the pipe lines reaches a predetermined pipe thickness to be inspected by making use of the maximum pipe thickness reducing speed from the maximum pipe thickness reducing speed calculation unit and the predetermined pipe thickness to be inspected;
- a remaining life calculation unit which alculates remaining life of the pipe lines by making use of the maximum pipe thickness reducing speed from the maximum pipe thickness reducing speed calculation unit and a predetermined minimum necessary thickness of the pipes in the pipe lines; and
- a pipe thickness measurement annual plan and schedule preparing unit which prepares a pipe thickness measurement annual plan and schedule based on the next inspection time from the next inspection interval calculation unit and the remaining life from the remaining life calculation unit.

8. A thickness reducing evaluation system for pipes in pipe lines according to claim 2, further comprising:
- a next inspection interval calculation unit which determines an inspection interval until next time for the pipe lines through calculation of an interval when the pipe thickness of the pipe lines reaches a predetermined pipe thickness to be inspected by making use of the maximum pipe thickness reducing speed from the maximum pipe thickness reducing speed calculation unit and the predetermined pipe thickness to be inspected;
- a remaining life calculation unit which calculates remaining life of the pipe lines by making use of the maximum pipe thickness reducing speed from the maximum pipe thickness reducing speed calculation unit and a predetermined minimum necessary thickness of the pipes in the pipe lines; and
- a pipe thickness measurement annual plan and schedule preparing unit which prepares a pipe thickness measurement annual plan and schedule based on the next inspection time from the next inspection interval calculation unit and the remaining life from the remaining life calculation unit.

9. A thickness reducing evaluation system according to claim 1, wherein the pipe thickness reducing speed model formula constructing unit classifies the total measurement data in the plant concerned into three types, in that into the measurement data in the case where the inner fluid is a single liquid phase and the pipe material is a carbon steel, the measurement data in the case where the inner fluid is two phases of gas and liquid and the pipe material is a carbon steel, and the measurement data in the case where the pipe material is a low alloy steel, for determining the pipe thickness reducing speed used for constructing the pipe thickness reducing speed model formula, and the pipe thickness reducing speed model formula is constructed by making use of the thus classified total measurement data under the respective conditions.

10. A thickness reducing evaluation system according to claim 2, wherein the pipe thickness reducing speed model formula constructing unit classifies the total design data in the plant concerned into three types, in that into the design data in the case where the inner fluid is a single liquid phase and the pipe material is a carbon steel, the design data in the case where the inner fluid is two phases of gas and liquid and the pipe material is a carbon steel, and the design data in the case where the pipe material is a low alloy steel, for determining the pipe thickness reducing speed used for constructing the pipe thickness reducing speed model formula, and the pipe thickness reducing speed model formula is constructed by making use of the thus classified total design data under the respective conditions.

11. A thickness reducing evaluation system according to claim 1, wherein the pipe thickness reducing speed model formula constructing unit constructs the pipe thickness reducing speed model formulas under the respective conditions in such a manner that in the case where the inner fluid is a single phase of liquid and the pipe material is a carbon steel, the measurement result of the pipe line temperature or the measurement result of the fluid temperature in the pipe lines and the measurement result of the fluid flow speed in the pipe line are used as the parameters for expressing the pipe thickness reducing speed, in the case where the inner fluid is two phases of gas and liquid and the pipe material is a carbon steel, the measurement result of the pipe line temperature or the measurement result of the fluid temperature in the pipe lines and the measurement result of the wetness of the fluid in the pipe lines are used as the parameters for expressing the pipe thickness reducing speed and in the case where the pipe material is a low alloy steel, the measurement result of the pipe line temperature or the measurement result of the fluid temperature inside the pipe lines is used as the parameter for expressing the pipe thickness reducing speed.

12. A thickness reducing evaluation system according to claim 2, wherein the pipe thickness reducing speed model formula constructing unit constructs the pipe thickness reducing speed model formulas under the respective conditions in such a manner that in the case where the inner fluid is a single phase of liquid and the pipe material is a carbon steel, the pipe line temperature and the fluid flow speed in the pipe line which were estimated in the design stage thereof are used as the parameters for expressing the pipe thickness reducing speed, in the case where the inner fluid is two phases of gas and liquid and the pipe material is a carbon steel, the pipe line temperature and the wetness of the fluid in the pipe lines which were estimated in the design stage thereof are used as the parameters for expressing the pipe thickness reducing speed and in the case where the pipe material is a low alloy steel, the pipe line temperature which was estimated in the design stage thereof is used as the parameter for expressing the pipe thickness reducing speed.

13. A thickness reducing evaluation system according to claim 1, wherein the first subunit for measuring the pipe line temperature or the fluid temperature inside the pipe line constituting the pipe line condition measurement unit evaluates the temperature of the inner surface of the pipe lines from the temperature of the outer surface of the pipe lines through a thermo couple attached on the outer surface of the pipe lines and a reverse problem analysis program based on thermal conduction analysis result of the pipe lines.

14. A thickness reducing evaluation system according to claim 1, wherein the next inspection interval calculation unit sets the next inspection interval in such a manner that a permissible pipe thickness reducing amount permitted until the next inspection which is obtained by subtracting the predetermined pipe thickness to be inspected from the present pipe thickness concerned is at first divided by the maximum pipe thickness reducing speed calculated by the maximum pipe thickness reducing speed calculation unit and then the calculated interval is further divided by a predetermined safety rate.

15. A thickness reducing evaluation system according to claim 2, wherein the next inspection interval calculation unit sets the next inspection interval in such a manner that a permissible pipe thickness reducing amount permitted until the next inspection which is obtained by subtracting the predetermined pipe thickness to be inspected from the present pipe thickness concerned is at first divided by the maximum pipe thickness reducing speed calculated by the maximum pipe thickness reducing speed calculation unit and then the calculated interval is further divided by a predetermined safety rate.

16. A thickness reducing evaluation system according to claim 7, wherein the pipe thickness measurement annual plan and schedule preparing unit prepares the pipe thickness measurement annual plan and schedule in such a manner that the next inspection interval calculated by the next inspection interval calculation unit and the remaining life calculated by the remaining life calculation unit are displayed with regard to all pipe line portions in the plant requiring inspection and further the inspection time after the next inspection is also displayed with regard to the all pipe line portions.

17. A thickness reducing evaluation system according to claim 8, wherein the pipe thickness measurement annual plan and schedule preparing unit prepares the pipe thickness measurement annual plan and schedule in such a manner that the next inspection interval calculated by the next inspection interval calculation unit and the remaining life calculated by the remaining life calculation unit are displayed with regard to all pipe line portions in the plant requiring inspection and further the inspection time after the next inspection is also displayed with regard to the all pipe line portions.

18. A thickness reducing evaluation system for pipes in pipe lines according to claim 1, wherein the pipe thickness reducing speed model formulas constructed in the pipe thickness reducing speed model formula construction unit are reconstructed through the use of the latest data of pipe thickness measurement portions performed every periodical inspection of the plant.

19. A thickness reducing evaluation system for pipes in pipe lines according to claim 2, wherein the pipe thickness reducing speed model formulas constructed in the pipe thickness reducing speed model formula construction unit are reconstructed through the use of the latest data of pipe thickness measurement portions performed every periodical inspection of the plant.

20. A method of setting pipe thickness in pipe lines made of either a carbon steel or a low alloy steel in a plant controlled under demineralized water which takes into account of pipe thickness reducing due to erosion and corrosion in advance at the time of design stage thereof comprising the steps of:

constructing a pipe thickness reducing speed model formula for a concerned pipe to be designed by classifying pipe thickness measurement data in a plant controlled under demineralized water and operated until now, when constructing the pipe thickness reducing speed model formula, the pipe thickness reducing speed data are classified depending on differences whether the pipe material is a carbon steel or a low alloy steel and whether the pipe inner fluid which was estimated in the design stage is a single phase of liquid or two phases of gas and liquid, in that the thus classified pipe thickness reducing speed data are formulated into model formulas in such a manner that in the case where the pipe inner fluid which was estimated at the design stage is a single phase of liquid and the pipe material is a carbon steel, the pipe line temperature and the fluid flow speed in the pipe line which were estimated in the design stage are used as the parameters, in the case where the pipe inner fluid which was estimated in the design stage is two phases of gas and liquid and the pipe material is a carbon steel, the pipe line temperature and the wetness of the fluid in the pipe lines which were estimated in the design stage are used as the parameters and in the case where the pipe material is a low alloy steel, only the pipe line temperature which was estimated in the design stage is used as the parameter, thereby, a group of pipe thickness reducing speed model formulas which take into account the pipe material and the inner fluid states are determined;

determining whether the pipe line of the design object is a carbon steel or a low alloy steel as well as determining the pipe temperature, the pipe line inner fluid wetness and the pipe line inner fluid flow speed;

selecting among the previously constructed group of the pipe thickness reducing speed model formulas a suitable pipe thickness reducing speed model formula which meets the determined pipe material and the inner fluid states;

determining a pipe thickness reducing speed based on the selected pipe thickness reducing speed model formula by making use of the determined parameter values in the design state;

calculating a minimum necessary pipe thickness which is required for the pipe based on information such as pressure of the inner fluid and diameter of the pipe representing design specifications;

determining a design life time for the plant;

after determining the design life time for the plant, preparing a diagram in which the pipe thickness is indicated along the ordinate and time is indicated along the abscissa;

drawing from a point on the ordinate corresponding to the minimum necessary pipe thickness a minimum necessary pipe thickness line in parallel with the abscissa;

further drawing from a point representing the design life time of the plant on the minimum necessary pipe thickness line a straight line raising leftward with a slope corresponding to the pipe thickness reducing speed; and determining the pipe thickness at the crossing point of the straight line with the slope of the pipe thickness reducing speed with the ordinate, namely at the time of zero representing the operation starting time of the plant as the design thickness.

* * * * *